(12) United States Patent
Fuwausa

(10) Patent No.: US 7,418,726 B2
(45) Date of Patent: Aug. 26, 2008

(54) ILLUMINATED DEVICES USING UV-LED'S

(75) Inventor: Michelle J. Fuwausa, Columbia, MD (US)

(73) Assignee: Intellectual Property & Ideas, LLC, Columbia, MD (US)

(*) Notice: Subject to any disclaimer, the term of this patent is extended or adjusted under 35 U.S.C. 154(b) by 780 days.

(21) Appl. No.: 10/751,204

(22) Filed: Jan. 2, 2004

(65) Prior Publication Data

US 2004/0160762 A1    Aug. 19, 2004

Related U.S. Application Data

(60) Provisional application No. 60/465,460, filed on Apr. 28, 2003, provisional application No. 60/437,425, filed on Jan. 2, 2003.

(51) Int. Cl.
*G11B 17/04* (2006.01)

(52) U.S. Cl. .................................................. 720/718

(58) Field of Classification Search ................ 720/718; 369/103, 286, 288, 283, 275.1, 275.5; 362/103
See application file for complete search history.

(56) References Cited

U.S. PATENT DOCUMENTS

| | | | |
|---|---|---|---|
| 3,207,051 A * | 9/1965 | Cooper et al. ............... 396/561 |
| 4,561,042 A | 12/1985 | Wehner et al. |
| 4,899,453 A | 2/1990 | Bhat et al. |
| 5,408,296 A | 4/1995 | Okutsu et al. |
| 5,477,430 A | 12/1995 | La Rose |
| 5,703,837 A | 12/1997 | Umemoto et al. |
| 5,899,553 A | 5/1999 | Howell |
| 6,106,127 A | 8/2000 | Fuwausa |
| 6,145,209 A | 11/2000 | Chang |
| 6,299,321 B1 | 10/2001 | Fuwausa |
| 6,556,531 B1 * | 4/2003 | Yagi et al. ................... 369/103 |
| 6,575,593 B2 | 6/2003 | Krietzman |
| 6,729,738 B2 * | 5/2004 | Thompson et al. ............ 362/84 |
| 7,039,927 B2 * | 5/2006 | Constantinou et al. ...... 720/718 |
| 7,106,676 B2 * | 9/2006 | Matos ....................... 369/53.21 |
| 7,184,392 B2 * | 2/2007 | Bigley ....................... 369/290.1 |
| 2004/0004931 A1 * | 1/2004 | Pergl .......................... 369/283 |
| 2004/0121268 A1 * | 6/2004 | Conroy et al. ............... 430/321 |

(Continued)

OTHER PUBLICATIONS

International Search Report dated Mar. 1, 2005; from corresponding Application No. PCT/US04/13022 filed Apr. 28, 2004 and published on Nov. 11, 2004 as Publication No. WO 2004/097290; Applicant/Inventor: Michelle J. Fuwausa.

(Continued)

*Primary Examiner*—Allen T Cao
(74) *Attorney, Agent, or Firm*—Gottlieb, Rackman & Reisman

(57) ABSTRACT

A UV-LED is incorporated into a variety of different illumination and radiation devices suitable for illuminating indicia associated with a CD/CDRW/DVD storage medium, gauges, promotional displays, knobs or buttons for automotive or electronic devices, as well as ornaments and air purification by decomposition. The indicia are made of a material responsive to UV emissions to render the indicia visible. The devices may be used in motor vehicles, commercial promotions and displays, electronic devices with the UV-LED's oriented to direct the UV emissions toward the indicia and even positioned in a manner for air purification. Embodiments are presented for UV-LED's from above, the side, and underneath said embodiments of the invention.

20 Claims, 12 Drawing Sheets

U.S. PATENT DOCUMENTS

| | | | |
|---|---|---|---|
| 2004/0136293 A1* | 7/2004 | Matos | 369/53.21 |
| 2004/0184390 A1* | 9/2004 | Oishi | 369/275.1 |
| 2004/0212988 A1* | 10/2004 | Fuwausa | 362/103 |
| 2005/0018595 A1* | 1/2005 | Conroy et al. | 369/288 |
| 2005/0041557 A1* | 2/2005 | Yagi et al. | 369/103 |
| 2005/0073941 A1* | 4/2005 | Usami | 369/275.4 |
| 2006/0053433 A1* | 3/2006 | Nakatani et al. | 720/718 |
| 2006/0075418 A1* | 4/2006 | Kurt et al. | 720/718 |

OTHER PUBLICATIONS

International Written Opinion dated Mar. 1, 2005; from corresponding Application No. PCT/US04/13022 filed Apr. 28, 2004 and published on Nov. 11, 2004 as Publication No. WO 2004/097290; Applicant/Inventor: Michelle J. Fuwausa.

Office Action dated Jul. 23, 2004 in related U.S. Appl. No. 90/007,030; Inventor: Fuwausa.

Office Action dated Jun. 10, 2005 in related U.S. Appl. No. 90/007,030; Inventor: Fuwausa.

* cited by examiner

ILLUMINATED DEVICES USING UV-LED'S

RELATED APPLICATIONS

This application claims priority to provisional applications Ser. No. 60/437,425 filed Jan. 2, 2003; and Ser. No. 60/465,460 filed Apr. 28, 2003; incorporated herein by reference.

The subject matter of this application is also related to application Ser. No. 10/139,660 filed May 3, 2002, entitled Improvements in Illumination Devices for Watches and other Instruments, incorporated herein by reference, now U.S. Pat. No. 6,729,738.

BACKGROUND OF THE INVENTION

A. Field of the Invention

This invention relates generally to an improvement in illumination devices such as indicator gauges, which may comprise a meter panel, directional gauges, used for example in motor vehicles, illumination of a storage medium such as a DVD or CD, poster or picture which are illuminated under poor lighting conditions and an air purification system all of which utilize UV-LED's.

B. Description of the Prior Art

In my Pending U.S. patent application Ser. No. 10/139,660 and a notice of allowance on Nov. 4, 2003, incorporated herein by reference, I have described various applications using UV-LED's. The following concepts comprise various extensions to the basic patented invention of the patent.

OBJECTIVES AND SUMMARY OF THE INVENTION

It is, accordingly, an objective of the present invention to extend the above-mentioned uses of UV-LED's and provide a new and improved system through which sufficient illumination or radiation can be provided to both indicia of interest as well as logos and other decorative elements.

It is another objective of the present invention to provide an improved illumination device for viewing storage medium such as DVD's or CD's in low light or in the dark.

Another objective of the invention is to provide an improved illumination of indicia, numbers, or logos on knobs or control buttons in a vehicle or an electronic device such as a stereo system.

Another objective of the invention is to provide illumination from underneath or behind an instrument or gauge for use in an automobile.

Another objective of the invention is to provide illumination of commercial or consumer advertising such as posters or pictures.

A further objective is to provide an air purification system using UV-LED's that would decompose organic materials rather than absorb.

The present invention seeks to attain these objectives by disposing a light emitting element, on, inside or in close proximity of the center, sides, above or behind in an orderly, systematic or random placement and rendered light emissive or is activated by means of an electronic circuit which is installed within or in close proximity of said article.

More particularly, the light source is disposed either on an inner surface or is imbedded within the cover or article itself, in such a manner that is aesthetic but functional and virtually invisible to the viewer.

In many instances various objects must be observable in the dark or under low lighting conditions. In instances where it is not possible, or it is inconvenient to provide full illumination, low level lighting is provided to light the observed object either directly, laterally, using edge-effect type lighting or using backlight type illumination (wherein the light source is built into or disposed behind the object to be observed). However, these solutions have been found to be unsatisfactory because they provide mediocre lighting at best. Moreover, in many instances these types of devices are not pleasing esthetically.

For example, most automobiles, motorcycles or aeronautical vehicles use some form of interior and/or instrument illumination for visibility at night or in low visibility conditions. This illumination system is usually based on electroluminescent (EL), incandescent or LED devices, which require special controls, power supplies, dimmers and so on.

Another example where improved illumination would be useful are knobs and buttons for automotive and electronics such as a stereos. Under poor lighting conditions most knobs or buttons are provided with little or no illumination and accordingly they are very hard to see.

One effective means of lighting objects comprise so-called black lights. This type of lighting is particularly desirable for providing illumination under low lighting conditions and are especially useful when used in combination with fluorescent inks or objects having fluorescent colors applied on the object being illuminated. However, until now, all black light sources comprised high voltage tubes or incandescent lamps that have been coated with a filter adapted to transmit UV light and block most visible light. Typically these filters do allow a small amount of light to escape from the tube in the violet range so that the light can be seen with the naked eye when turned on.

Similarly, a UV light source can be positioned in close proximity or within the housing of a CD/DVD and used to illuminate a fluorescent or phosphorescent treated storage medium such as a CD or DVD for viewing in low light or in the dark.

As an integrated unit within a commercial display unit or around a frame or template the UV light source would be positioned for maximum illumination. Under the most efficient circumstances a single UV-LED light source could be positioned above the illuminated object at a predetermined distance for effective illumination but in manner that insures that it will not interfere with the users vision or periphery. The UV light source could be made to provide a broad radial pattern over the entire area or modified with a directional cone or shield focusing the light to the desired area for illumination.

Inks or other materials responsive to UV light (such as fluorescent and phosphorescent inks etc.) are applied onto or processed into the storage medium such as a CD or DVD, knob or button, and could be made into shapes, diagrams, logos, images or numerals in multiple colors such as red, green, yellow, orange, blue or purple.

A UV light source can also be used to decompose organic material. This can prove to be most effective in air purification when the UV source is positioned to intersect the airflow in a manner that would irradiate airborne organic material.

BRIEF DESCRIPTION OF THE DRAWING

The invention will be better understood by reference to the following description, taken in connection with the appended drawings, in which like reference numerals indicate like parts, and in which.

DETAILED DESCRIPTION OF THE INVENTION

Figure 1:
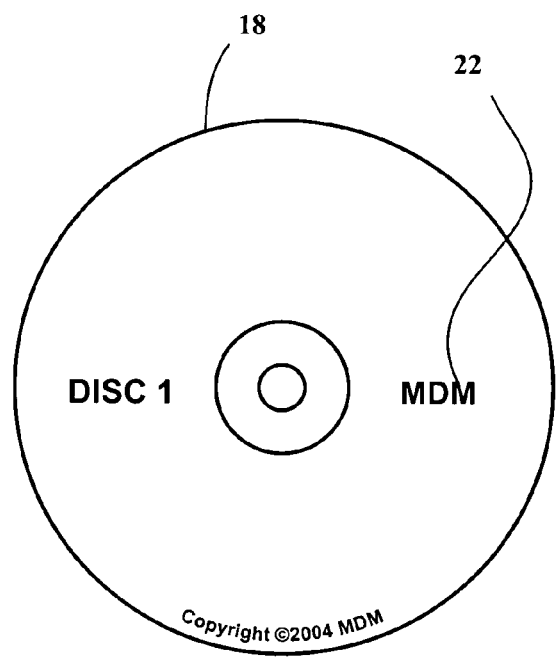
FIG. 1 shows a front view of a storage medium.

FIG. 1 shows a typical storage media 18 such as CD, a DVD, a CDRW or other similar electronic storage medium. The media has a top surface that is provided with a label 22 that has been preferably treated with fluorescent or phosphorescent ink or other similar material that is responsive to UV light, as discussed in more detail below. The term label is used herein broadly to cover a pure layer of UV responsive material deposited directly on the disc, as well as labels formed of substrates with inks deposited thereon. Moreover, disc 18 may have one or more such labels on its top side, bottom side and/or circumferential perimeter.

The label may include or be provided in the form of a design, image, logo or indicia and, because it is responsive to UV light, it glows or fluoresces when exposed to a UV light source. It is important to note that phosphorescent materials store the UV radiation and release the energy as visible illumination for an extended length of time even when the UV source is removed or disabled. This is especially helpful for identification or inspection purposes or during low visibility conditions.

The labels can produce commercially, or using an office or home printer with software capable of designing and printing labels using fluorescent or phosphor inks.

Figure 2:
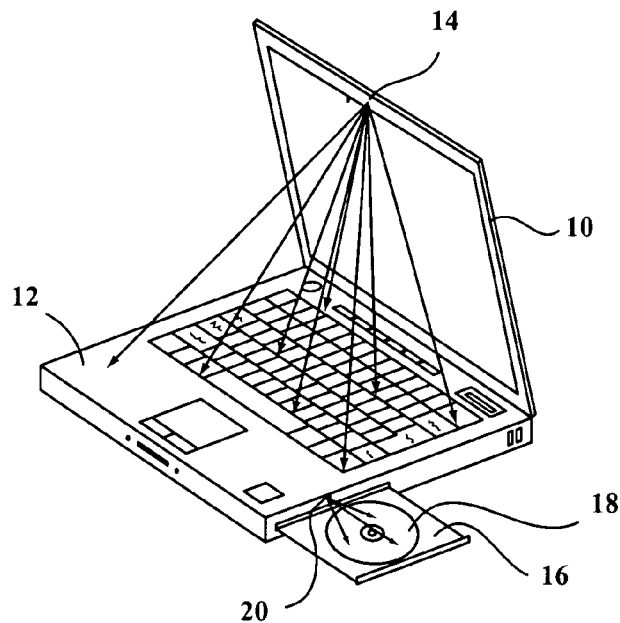
FIG. 2 shows a laptop computer adapted to provide lighting in accordance with this invention.

FIG. 2 shows a laptop computer 10 with a keyboard 12 illuminated by a UV source 14. In addition, on one side, the laptop has a drive including a tray 16 for selectively holding a disc 18, as shown. At least one UV source such as a UV-LED 20 is positioned inside or over the tray to illuminate the disc 18. The UV-LED may also be positioned adjacent to the tray, in close proximity to the tray, could pivot from a protected position within the tray or the housing of the laptop 10. The UV-LED can be spring loaded so that as the tray 16 is opened, the UV-LED pops-up in a position from which it can illuminate the label 22 on disc 18. The same principles may be used to position the UV-LED in a standard computer, a portable clam shell device such as a Sony Walkman®, a clam shell device on a vertical or horizontal electronic stereo system, or even in a container used to store the disc 18.

In the embodiment of FIG. 2, when the tray 16 opens the UV-LED 20 activates, remaining in the 'on' position until the tray is closed. The UV-LED 20 can also be activated by a button (not shown) that is remotely operated, or positioned near the tray 16. The button can also be on the surface of the disc 18. The button could also be preprogrammed to activate in different increments, such as in three-second intervals, or randomly.

Figure 3A:
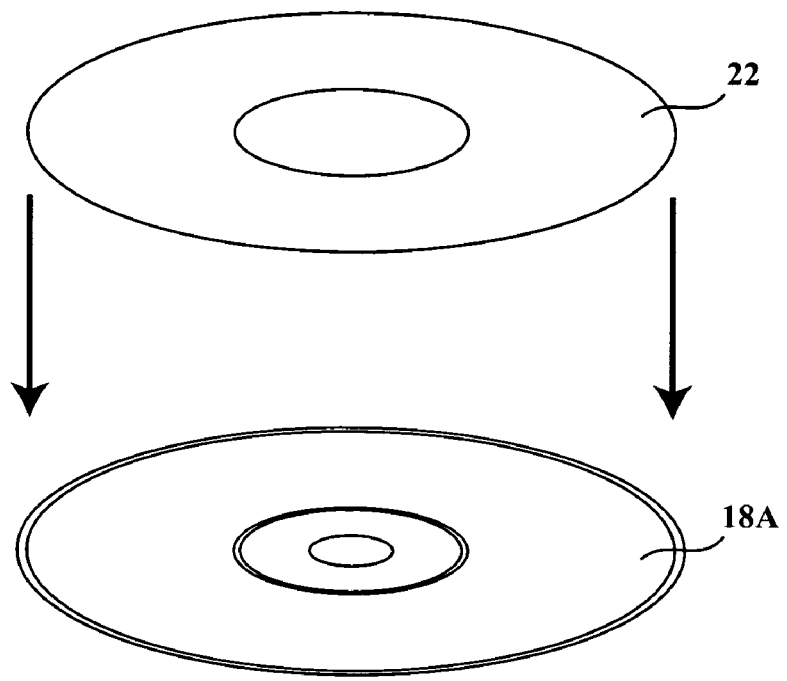
FIGS. 3A and 3B show a storage medium in accordance with this invention.
Figure 3B:
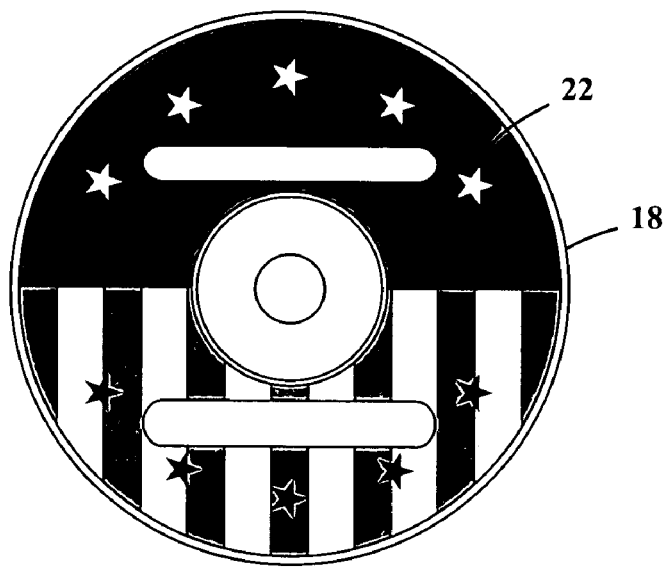

A disc body 18A can also be provided with a prepackaged label 22 to form the disc 18, the label bearing a design, image, logo or indicia and treated with phosphorescent or fluorescent materials allowing illumination under ultraviolet light, as shown in FIGS. 3A and 3B.

What makes this idea novel is that a disc can be viewed in the dark using ultraviolet light. This reading of the disc is both novel and practical in a dark room, a club or vehicle. With the advent of UV-LEDs it will make it practical to focus a single LED onto the treated storage medium and read the, artist, song, design, image, logo or indicia without activation of visible illumination.

Figure 4A:
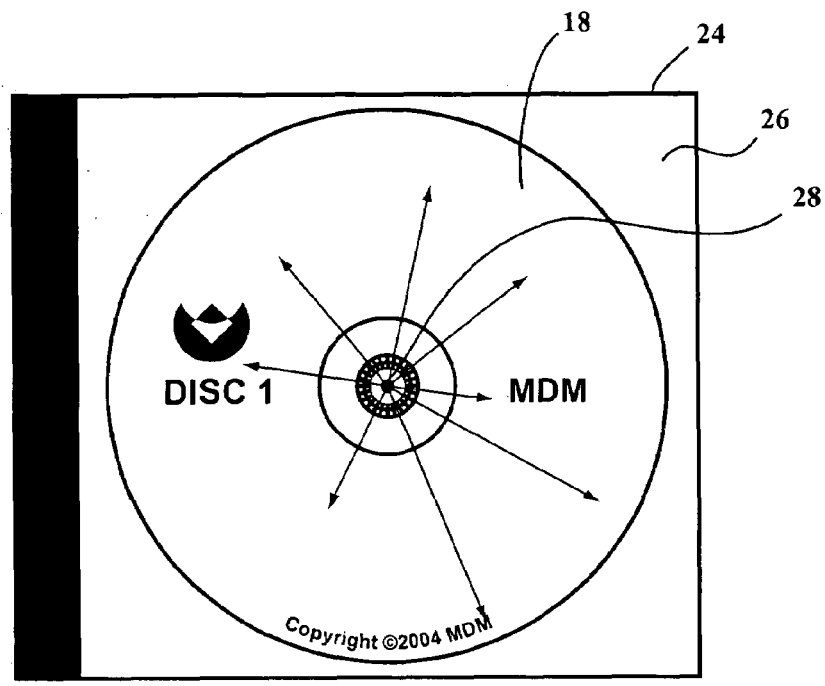
FIGS. 4A and 4B shows a front view of a storage medium in a protective jewel case.
Figure 4B:
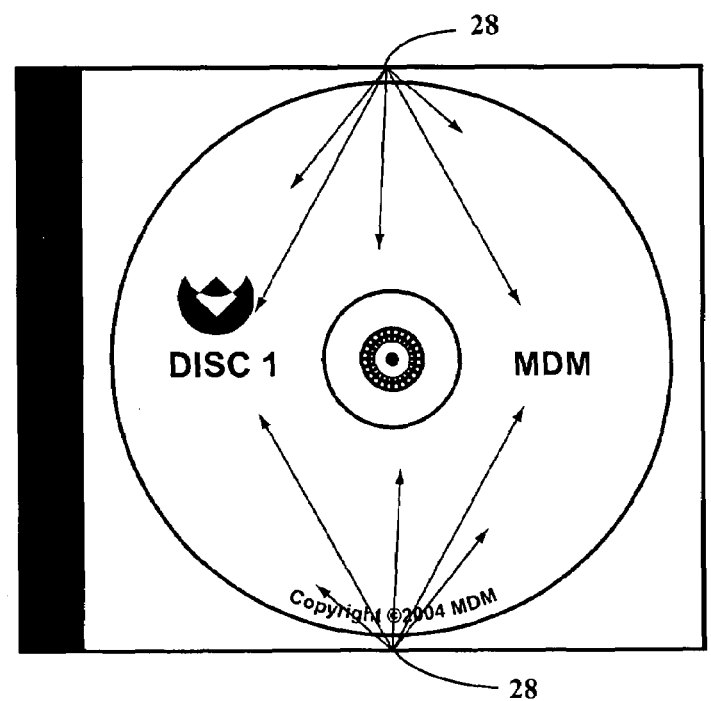

FIGS. 4A and 4B shows a case (or jewel box) 24 holding disc 18 with a transparent or translucent cover 26. At least one light source, preferably a UV-LED 28 is positioned above the disc 18, for example secured to cover 26. Alternatively, as shown in FIG. 4B, two or more UV-LEDs 28 may be positioned in the case around the disc 18 as shown. When the UV-LED is activated, it excites the phosphorescent or fluorescent inks on the label 22.

Figure 5:
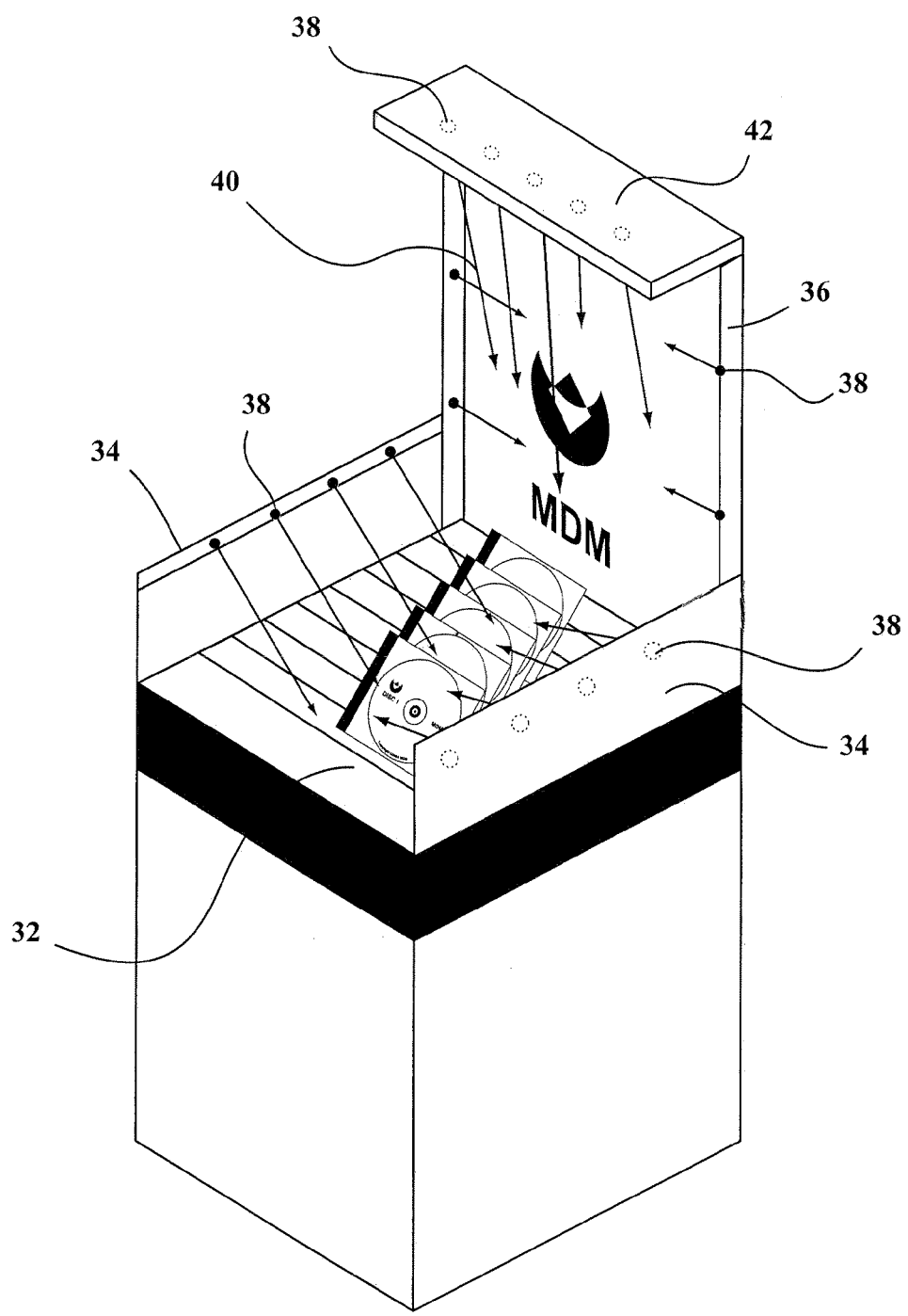
FIG. 5 shows a device for displaying and promotion of items in accordance with this invention.

FIG. 5 shows a display case 30 having a display zone holding several discs 18 with or without cases 26. The display case 30 further includes lateral walls 34 and an end wall 36 with a horizontal extension 42. At least one but preferably a plurality of UV-LEDs 38 are positioned on the sidewalls 34 or the extension 42. The UV-LEDs are systematically or random activated in order to excite the images, logos, designs or indicia which could be located on the display case, such as the wall 40, as well as the jewel boxes 26 within the display zone 32. Moreover, the zone 32 could also be used to hold watches or other products that have elements treated with phosphorescent or fluorescent materials. This display case 30 is effective for retail sales, trade shows and to draw attention to the products contained therein.

Figure 6:
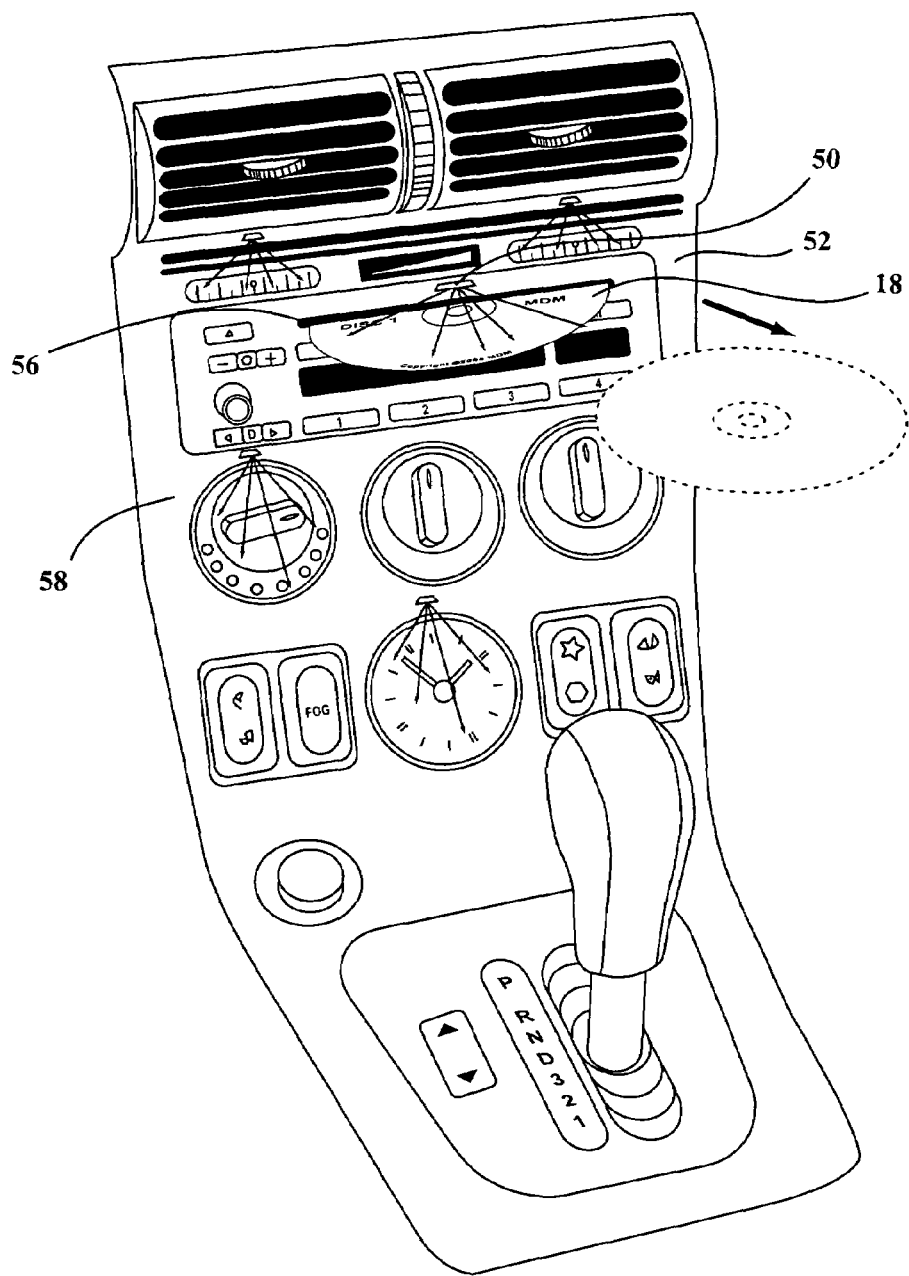
FIG. 6 shows schematically an automotive center console with various lighting arrangements in accordance with this invention.

FIG. 6 shows at least one UV-LED 50 positioned in automotive dashboard 52 in close proximity to the ejection system of a CD or DVD player 56. An automotive player 56 does not customarily have a tray but ejects the disc 18. The UV-LED 50 could be located from within the dashboard 52, over, or from the side but in close proximity of the ejection area and when the disc is ejected it could illuminate in preprogrammed or random increments; such as three-second intervals. A separate activation button could be placed on the face of the electronic system, or on a remote control.

Other UV-LEDs can be positioned on, or in close proximity of other parts of the automotive center console 58. The UV-LEDs are positioned over, in a recessed or indented cavity, from the side but nonetheless provide individual UV illumination for a button, knob or the like. This button or knob could be for adjustment of the heat, cold, ventilation, or even a clock. The button, knob or clock face could be treated with a phosphorescent or fluorescent material, which absorbs the electromagnetic radiation and releases the stored energy as visible illumination even after the UV-LED is deactivated.

Figure 7A:
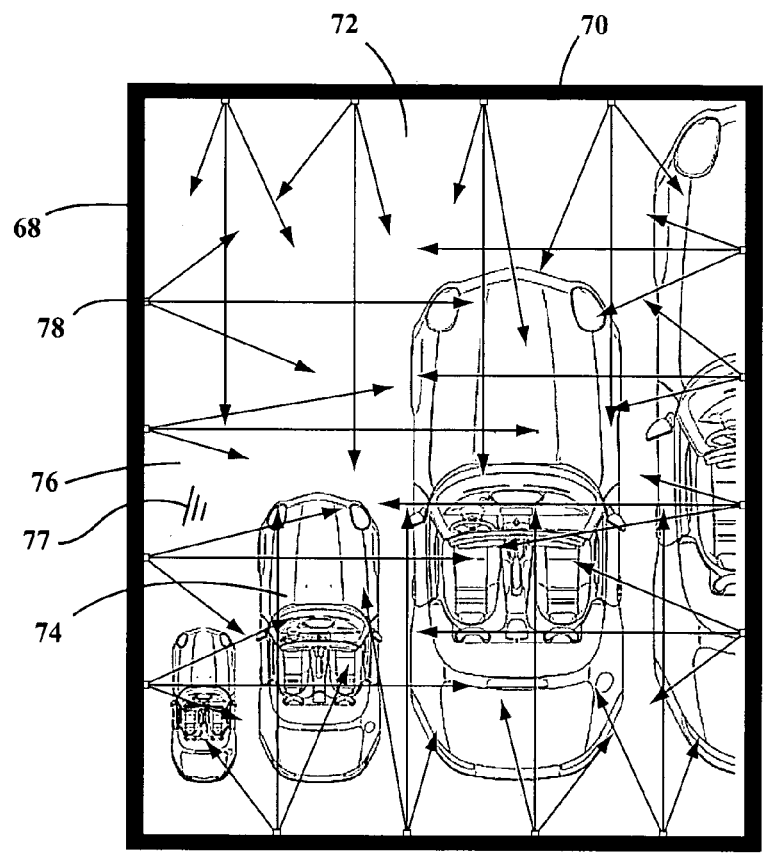
FIG. 7A-C show of a picture frame.
Figure 7B:
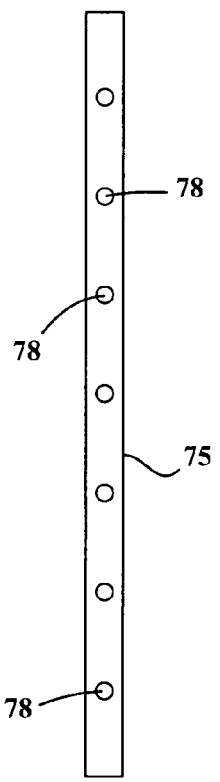
Figure 7C:
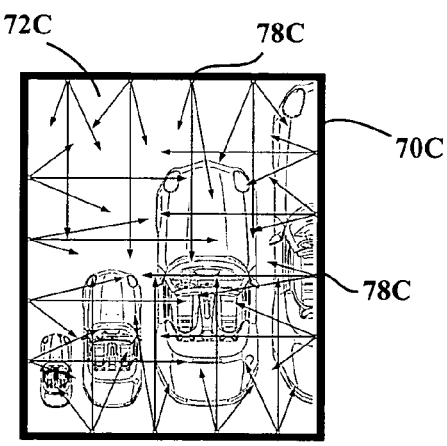

FIGS. 7A, 7B, and 7C show a picture frame 70 holding a picture 72 formed of an image, logo or design 74 on a substrate 76 of canvas, paper or other materials. The picture frame can hold, for instance, a promotional movie poster in a movie theatre. The picture 72 is encased or surrounded by edges 68 and a back panel (not shown). The edges 68 have a thickness and ability to support a plurality of UV-LEDs 78. Each UV-LED 78 (in this, and all the other embodiments) can be mounted on a flexible circuit 75 shown in FIG. 7B imbedded in the edges 68. As seen in FIG. 7A, the UV-LEDs 78 are positioned to radiate and to provide illumination to the picture 72 and excite the UV responsive elements 74. Preferably, a 10×UV-LED "tin can" structure is used with a wide radial pattern but UV-LEDs with narrow radial patterns can be pin-pointed to specific areas of the picture 72. The UV-LED "tin can" package could be connected to the flexible circuit 75 and could be positioned along the inner recesses of a frame or structure for cosmetic and esthetic reasons. The zones 74 are made from or treated with fluorescent and/or phosphorescent materials together with visible paints.

Alternatively, instead of being imbedded in the frame, the UV-LEDs can be mounted on cantilevered supports extending over the picture 72. The frame 70 can also include a protective sheet 77 made of plastic or glass, and the cantilevered UV-LEDs can be secured to the sheet 77. The UV-LEDs 78 can also-be mounted straight on the sheet 77 and connected to thin, almost invisible conductors, as disclosed in U.S. Pat. No. 6,486,561 incorporated herein by reference. The UV-LEDs would be angled to illuminate radiation towards, or from the side or from behind the picture 72.

FIG. 7C shows a frame 70C that is a smaller version of the frame 70 in FIG. 7A, and can provide UV illumination for a smaller picture 72C. The UV-LEDs 78C are positioned to illuminate radiation towards or along the surface, the sides or from behind the picture. The UV-LEDs are provided in "tin can" packages soldered to a flexible circuit or could be independently positioned to allow maximum illumination in a specified location. Ideally the illumination would provide an even distribution of illumination along the surface, sides or from behind the picture 72C.

Figure 8A:
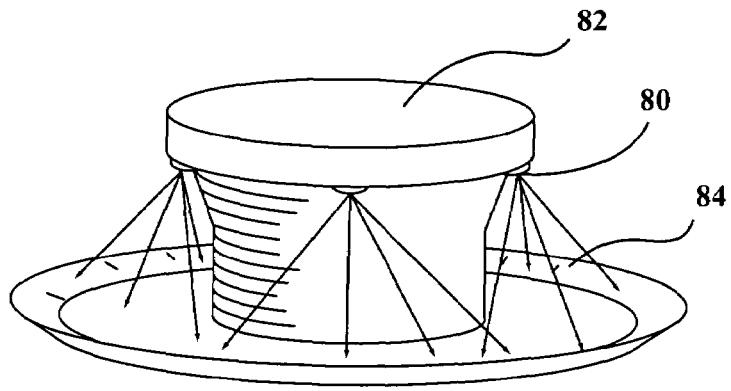
FIG. 8A-E show a knob.
Figure 8B:
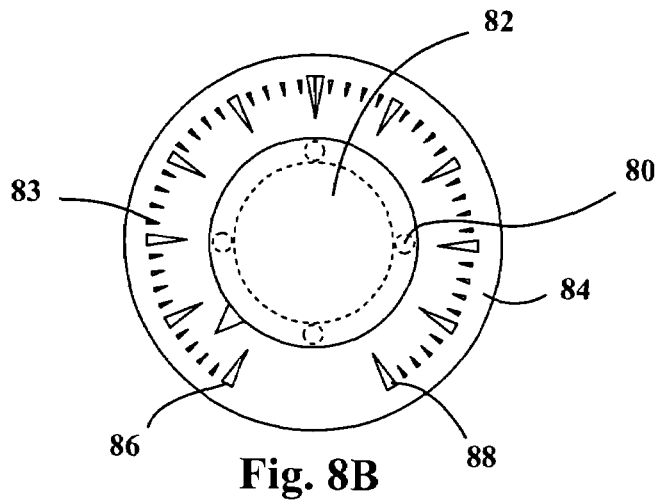

FIGS. 8A, 8B show an electromagnetic radiation device, preferably a UV-LED "tin can" 80 positioned under a knob 82 in a recessed area with the radiation pointed downward or sideways at a surrounding disc- or saucer-shaped dial 84 that is treated with phosphorescent or fluorescent material. The dial 84 is provided with an image, logo, design, numerals or other indicia 33 and glows when it becomes excited by the UV radiation. The knob 82 and dial 84 can be part of an electronic device. The image or indicia on dial 84 can have varying degrees of color intensity starting, for example, from the 7 o'clock position 86 toward the 5 o'clock position 88. The UV-LEDs render the indicia clearly visible under low lighting conditions or in the dark.

Figure 8C:
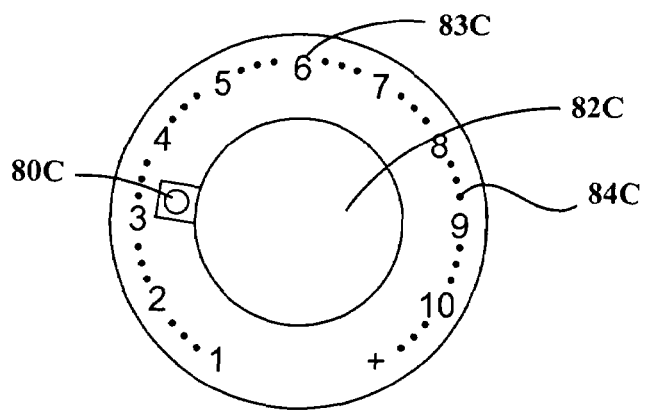

FIG. 8C, shows the top view of another knob 82C and dial 84C. The knob 82C includes at least one UV-LED 80C positioned and oriented to radiate at an angle downward, sideways or towards the indicia 83C made from or treated with phosphorescent or fluorescent materials. As the knob 82C or dial 84C is turned the UV-LED excites only the portion of the indicia 83C directly in front of, or below the UV-LED 80C. The indicia 83C can also have numerous colors, which can correspond to various parameters, such as volume or intensity. Alternatively, the UV-LED 80, 80C is connected to a current source that has a variable output indicative of a preselected parameter, and the intensity of the image 83, 83C is then related to the parameter. The intensity of the UV-LED 80, 80C can also be varied as the knob 82, 82C is turned around its axis.

Another embodiment (not shown) includes an electromagnetic radiation device, preferably a UV-LED, on or around the interior center aperture or on the inside of the outer perimeter of a knob that could have an image (including logo, indicia or information recessed so that the UV-LED is angled from the side but could be above the image. The image is treated with or made from phosphorescent or fluorescent materials so that when the UV-LED emits radiation, the image stores the energy and releases it as visible illumination even after the UV-LED is turned off. The recessed knob can have a clear or translucent cover over the entire knob so that the image is not worn from daily usage and also act as a protective cover from damage. This recessed knob is very effective in automotive, motorcycles, or aeronautics for viewing in low light or in the dark.

Figure 8D:
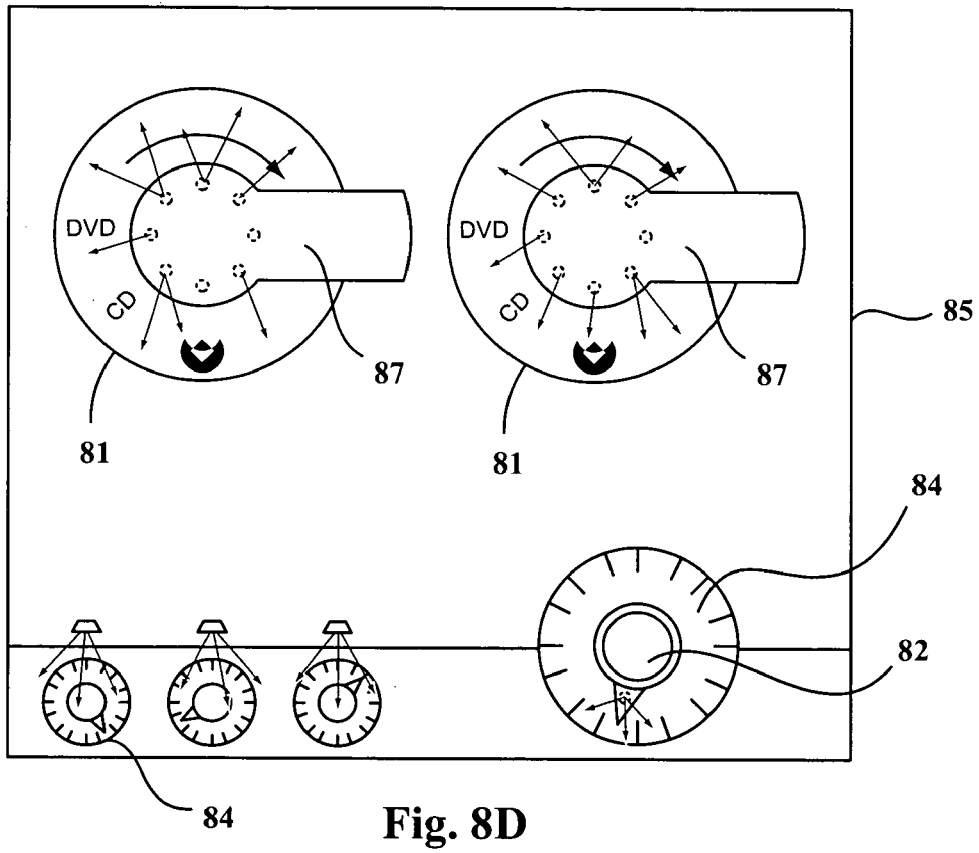
Figure 8E:
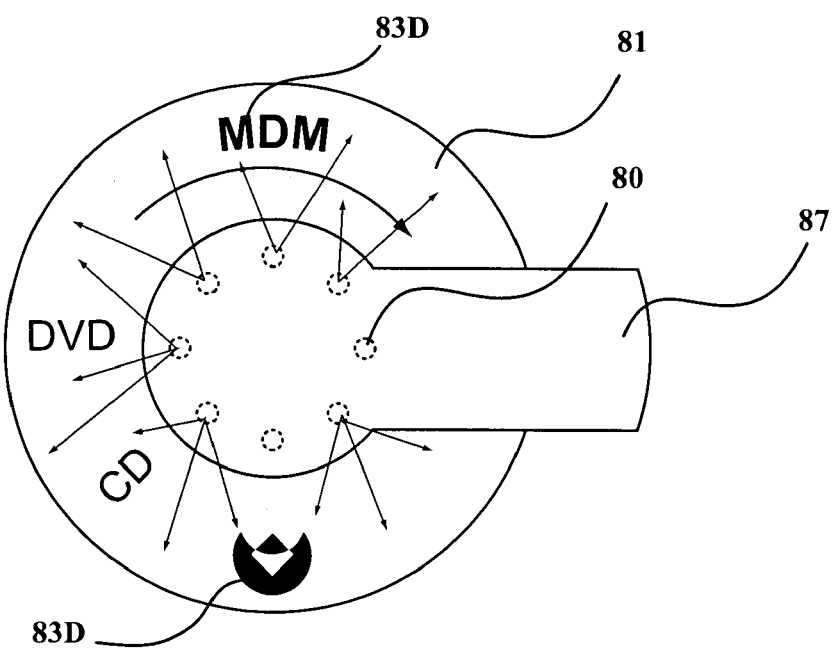

FIGS. 8D and 8E show one or more electronic storage mediums such as a CD or DVD 81 mounted in an appropriate player 85. The player includes a read head 87 using a cantilever support. At least one UV-LED 80 is positioned on the top, the side, underneath or in close proximity of the read head and releasing electromagnetic radiation toward the surface of medium 81 to excite the image 83D formed thereon. The player 85 includes several knobs 82 and dials 84 as shown.

FIGS. 9A-9F show another type of a gauge 90 on an instrument panel. For example, the gauge can be a speedometer or tachometer on a dashboard of a vehicle. The gauge includes a disc shaped top layer 91 with a central flange 92.

Figure 9A:
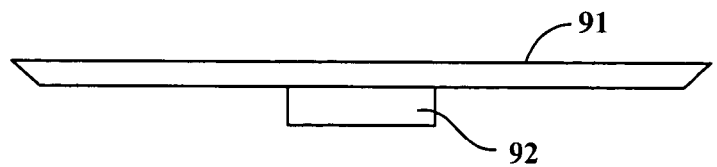
FIG. 9A-G shows details of a gauge.
Figure 9B:
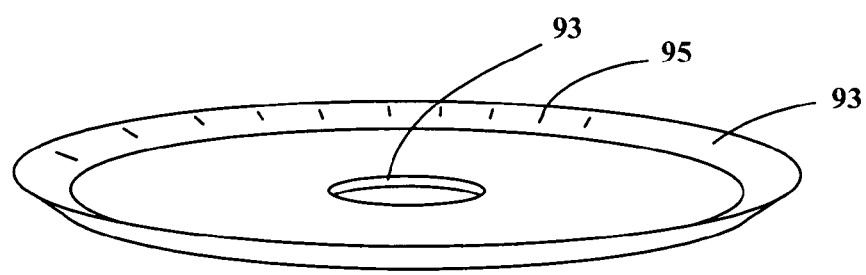
Figure 9C:
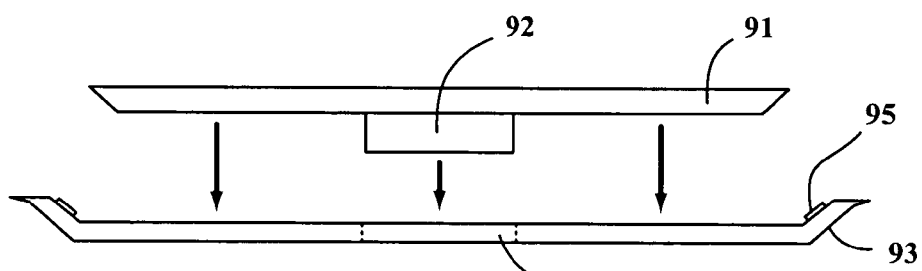

The second layer 93 of the gauge shown in FIG. 9B, is in the shape of a saucer or plate with a center aperture 94 receiving the flange 91. On the outer perimeter of second layer there are images 95 that may include numbers, dashes or other indicia. The images 95 are made from or include fluorescent or phosphorescent materials FIG. 9C shows the two layers 91 and 93 jointed connected at the center flange 92.

Figure 9D:
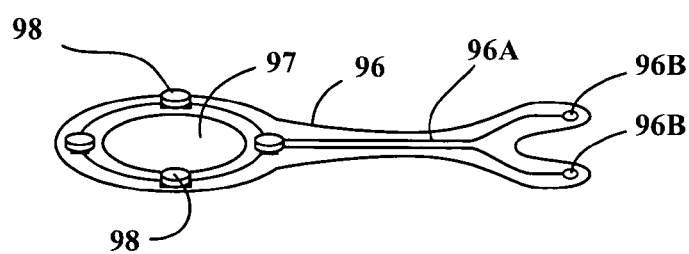

FIG. 9D shows a circuit board 96 with a center aperture 97 and a plurality of UV-LEDs 98. Additional electronics (not diagramed) are also deposited on the circuit board 96 as required. The electronics and the UV-LEDs 98 are provided with power by conductors 96A ending with connecting terminals 96B.

Figure 9E:
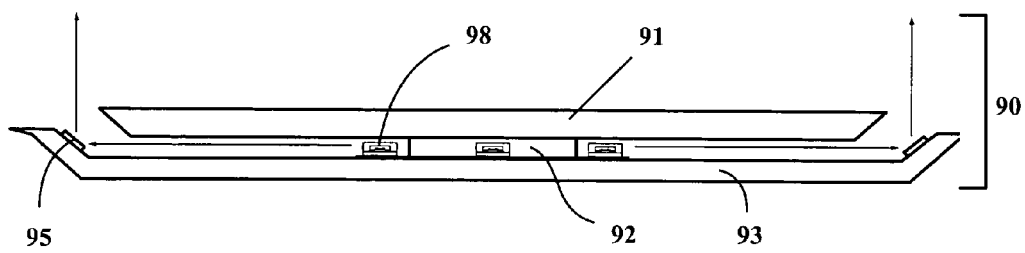

As shown in FIG. 9E, the circuit board 96 sandwiched between the layers 91 and 93. The UV light from the UV-LEDs 98 travel between the two layers to illuminate the images 95 on the outer perimeter.

Figure 9F:
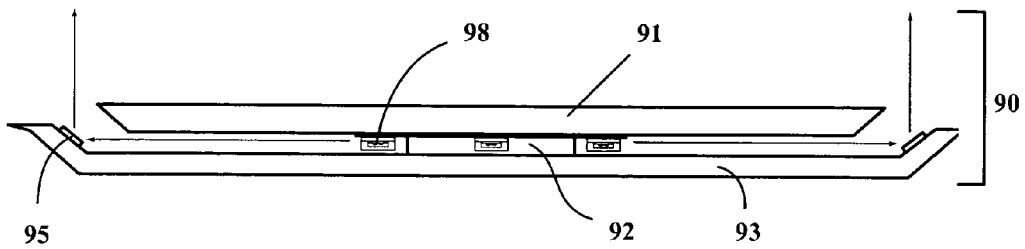

The embodiment of FIG. 9F is similar to 9E with the exception that the circuit board 96 is attached to the undersurface of layer 91. The undersurface of layer 91 and the top surface of layer 93, could have reflective coatings therefore allowing the maximum electromagnetic radiation to reach the outer perimeter and image 95.

Figure 9G:
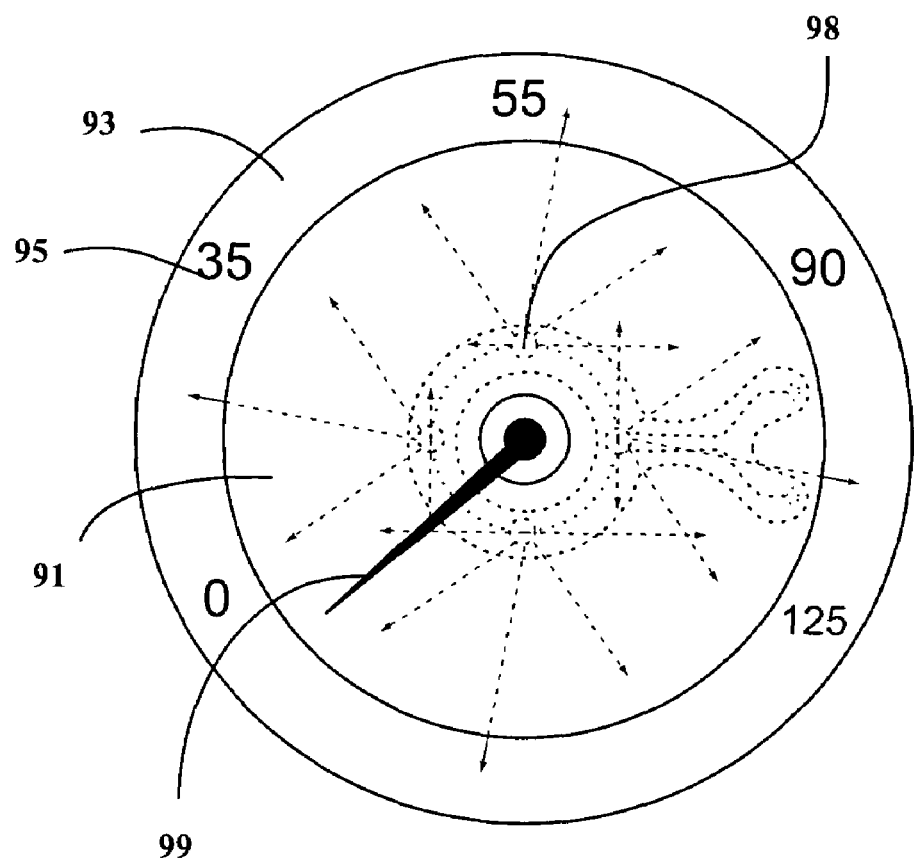
Figure 10A:
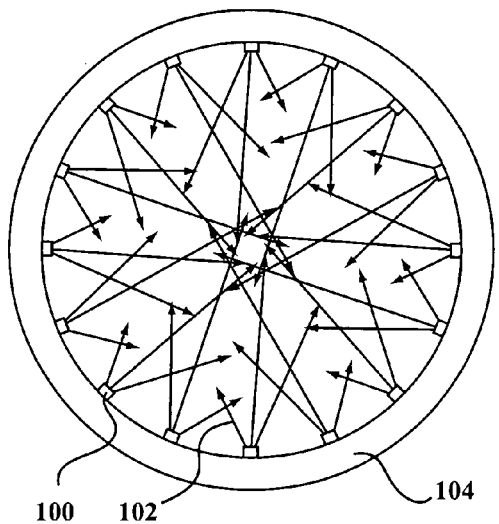
FIG. 10A-D shows a device for air purification.
Figure 10C:
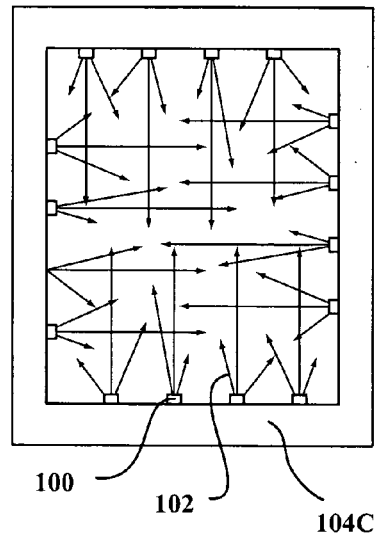
Figure 10D:
Figure 10B:
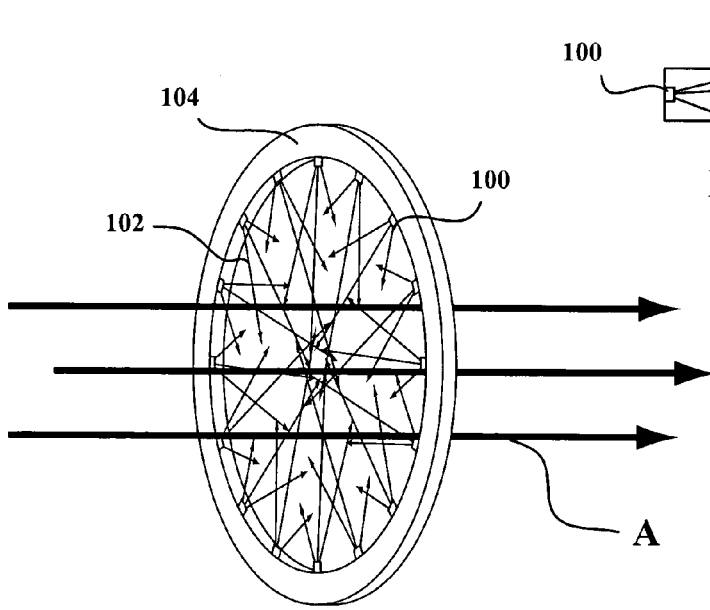

FIG. 9G, is a top view of the gauge 90. When the UV-LEDs 98 are activated the phosphorescent or fluorescent image 95 is excited and releases energy as visible illumination. A needle 99 is mounted on top of the layer 91 and is rotatable by a shaft (not shown) passing through layers 91 and 93.

Alternatively, 4 UV-LEDs in "tin cans" can be mounted just underneath the surface of the tachometer or speedometers face, allowing only the top part of the "tin can" to show through the surface, but far enough through the surface to allow the 180-degree electromagnetic radial pattern along the top of the surface. If any part of the perimeter were treated with fluorescent or phosphorescent material, it would become excited and release the stored energy as visible illumination.

FIG. 10A-10D show a device that uses high intensity UV-LEDs 100 that are set up to generate a cross hatching effect, creating an invisible sheet or plane of UV-rays 102. The UV-LEDs 100 generate radiation the ultraviolet spectrum, providing an effective solid-state method of air purification where the organic materials are decomposed, eliminating airborne bacteria. The UV-LEDs 100 could be spaced evenly, randomly, in a cluster or in a radial alignment on a frame 104 to provide a radiation zone. The frame 104 is attached to or integrated with an air processing apparatus such as an air conditioner, humidifier, dehumidifier, heater, etc., in a car, airplane, office, home, etc. The frame 104 is positioned so that an air flow or stream A from or within the apparatus passes through the field 102 and airborne bacteria particles are destroyed. The UV-LEDs could be positioned in front or behind an exiting air filter. The UV-LEDs could be designed to activate when the air processing apparatus is turned on, allowing outside air into the interior of the automobile or air purification during an emergency situation. As the airborne particles or bacteria enters the ventilation and is passed through the UV-LED's electromagnetic radiation, they are quickly and efficiently decomposed, providing safety from outside airborne particles and bacteria.

Obviously, numerous other modifications may be made to the invention without departing from its scope as defined in the appended claims.

I claim:

1. An electronic disc drive assembly comprising:
    an optical disc storing data and having a surfaced with an image composed of a UV-responsive material;
    a data reading device receiving said optical disc and selectively reading said data from said optical disc; and
    a source of UV radiation positioned to provide UV radiation on said image to render said image visible.

2. The assembly of claim 1 wherein said source of UV radiation is disposed on on said data reading device.

3. The assembly of claim 1 wherein said data storage disc is one of a DVD and CD disc.

4. The assembly of claim 1 wherein said assembly is a portable PC.

5. The assembly of claim 1 wherein said data reading device is a disc drive incorporated into a stereo disc player.

6. The PC of claim 5 wherein said PC is a portable PC.

7. The PC of claim 5 further comprising a tray selectively movable in and out of said disc drive and supporting said disc.

8. The device of claim 7 wherein said housing is a disc storage device used for storing and carrying said disc.

9. The device of claim 8 wherein said body is flat and is sized to hold a single disc.

10. The device of claim 8 wherein said box is sized and shaped to hold several discs stacked in order.

11. The device of claim 8 wherein said UV source is attached to said cover.

12. The device of claim 11 wherein said UV source is attached to said cover.

13. The device of claim 11 wherein said UV source is attached to one of said lateral walls.

14. The device of claim 13 wherein said disc drive includes a tray selectively sliding into said disc drive and supporting said disc.

15. The device of claim 7 wherein said portable consumer device is portable computer with a disc drive receiving said disc.

16. The device of claim 7 wherein said image is printed on a label and the label is adhesively attached to the disc.

17. A PC comprising:
    a housing;
    a disc drive disposed in said housing and receiving a data storage disc storing data having an image made from a UV-responsive material, said disc being selectively movable between a first position in which said disc is disposed inside said disc drive with said disc drive reading data from said data storage disc, and a second position in which said disc is disposed at least partially outside said disc drive with said image exposed; and
    a UV source attached to said housing and arranged to selectively direct UV light at said image when said disc is in said second position to render said image visible.

18. A portable consumer device comprising:
    a housing selectively receiving an optical disc storing data with a surface bearing an image visible when exposed to UV light; and
    a UV source attached to said housing and selectively illuminating the disc when the disc is disposed in said housing to render said image visible.

19. The device of claim 18 wherein said housing is a box having a body and a cover hingedly attached to said body.

20. The device of claim 18 wherein said housing is a jewelry case with lateral walls and a cover.

* * * * *